United States Patent [19]

Kunsman

[11] Patent Number: 4,886,304
[45] Date of Patent: Dec. 12, 1989

[54] ABRASIVE GRIP PIPE COUPLING

[75] Inventor: Donald R. Kunsman, Easton, Pa.

[73] Assignee: Victaulic Company of America, Easton, Pa.

[21] Appl. No.: 279,434

[22] Filed: Dec. 2, 1988

Related U.S. Application Data

[63] Continuation-in-part of Ser. No. 16,065, Feb. 18, 1987, abandoned.

[51] Int. Cl.$^4$ ............................................. F16L 21/04
[52] U.S. Cl. ................................. 285/104; 285/328; 285/342; 285/348; 285/356; 285/372; 285/901; 285/302
[58] Field of Search ............... 285/104, 105, 343, 328, 285/372, 901, 348, 356, 342

[56] References Cited

U.S. PATENT DOCUMENTS

| | | | |
|---|---|---|---|
| 2,452,275 | 10/1948 | Woodling | 285/343 X |
| 2,459,956 | 1/1949 | Muller | 285/343 X |
| 2,479,058 | 8/1949 | Botting | 285/104 X |
| 2,531,922 | 11/1950 | Seamark | 285/104 |
| 2,617,672 | 11/1952 | Nichols | 403/183 |
| 3,077,638 | 2/1963 | Hickam | 285/363 X |
| 3,149,861 | 9/1964 | Larsson | 285/369 X |
| 3,252,192 | 5/1966 | Smith | 285/367 X |
| 3,325,195 | 6/1967 | Margis | 285/369 X |
| 3,428,339 | 2/1969 | Haulik et al. | 285/328 X |
| 4,229,025 | 10/1980 | Volgstadt et al. | 285/105 |

FOREIGN PATENT DOCUMENTS

| | | | |
|---|---|---|---|
| 182275 | 6/1955 | Austria | 285/372 |
| 2415699 | 10/1975 | Fed. Rep. of Germany | 285/343 |
| 2726035 | 12/1977 | Fed. Rep. of Germany | 285/372 |

Primary Examiner—Thomas F. Callaghan
Attorney, Agent, or Firm—Abelman, Frayne, Rezac & Schwab

[57] ABSTRACT

A rigid coupling for plain ended pipe includes radially inwardly movable wedging members of a hard but ductile material, which optionally may be in the form of a collet, and a member providing a camming surface corresponding with an external camming surface on each of the wedging members, the wedging members each having an axially straight inner surface for cooperation with the external axial surface of a pipe, the inner surface of the wedging members being coated with a grit material of a hardness greater than that of the pipe and that of the wedging members, for it to become matrixed within the respective surfaces on the application of compressive forces to the wedging members.

21 Claims, 4 Drawing Sheets

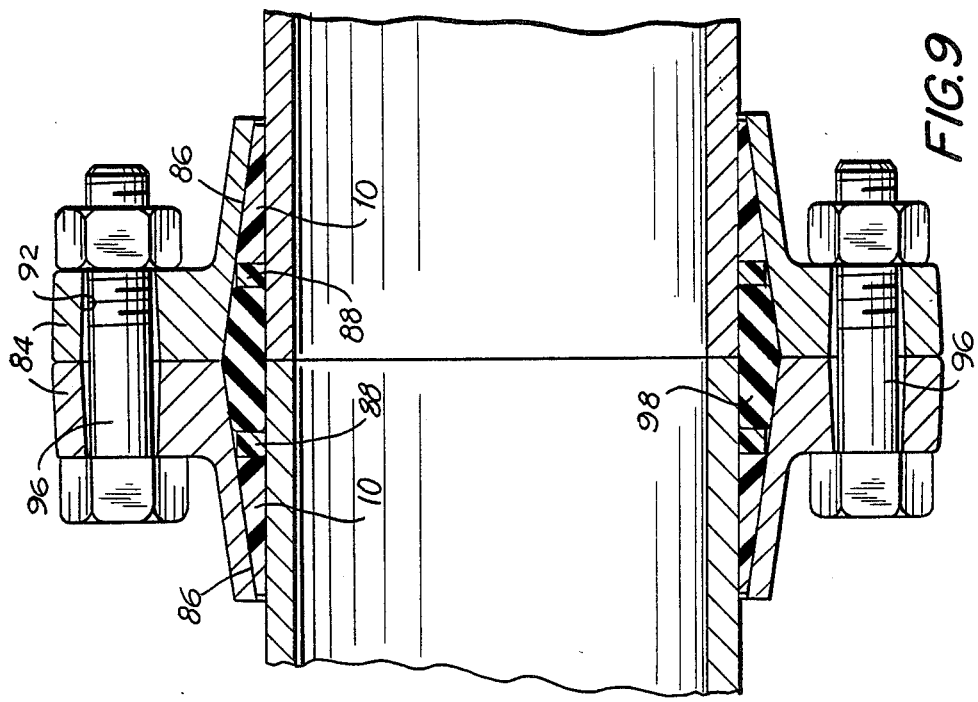
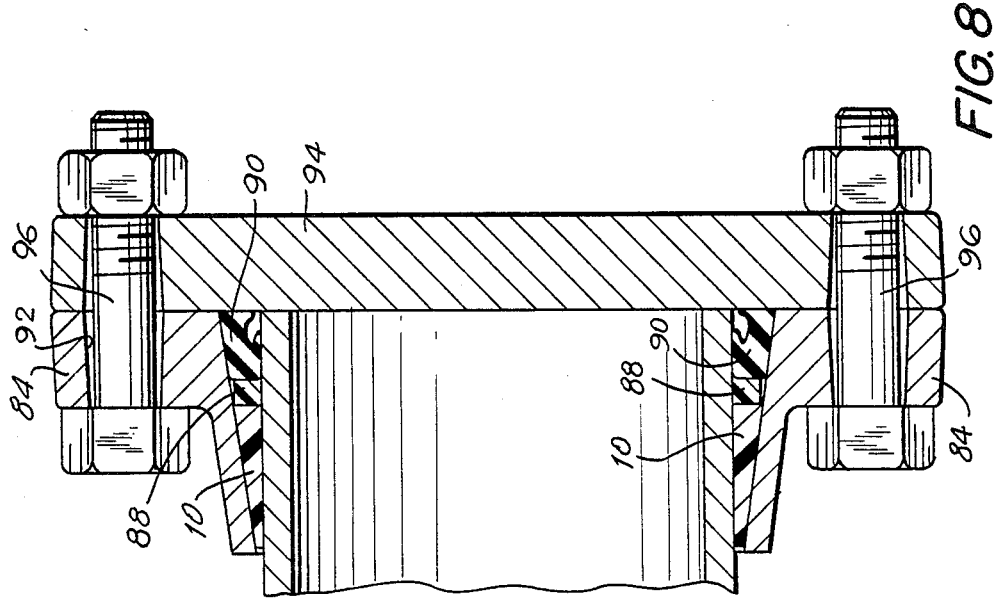

ABRASIVE GRIP PIPE COUPLING

This application is a continuation-in-part of application Ser. No. 07/016,065, filed Feb. 18, 1987, now abandoned.

FIELD OF THE INVENTION

This invention relates to a coupling for use in connecting a pair of plain ended pipes to each other in end-to-end sealed relationship, or, for connecting a single plain ended pipe to a complimentary nipple or fitting provided with a nipple.

While not limited thereto, the coupling of the present invention finds particular application in relatively lightweight and medium pressure piping systems, typical applications of the coupling being in the assembly of domestic piping systems assembled from thin walled copper pipe, typically three-quarter inch copper pipe of 0.060" wall thickness or less, or from pipes fabricated from plastics materials, such polybutylene, polyethylene, P.V.C., or C.P.V.C. piping of relatively thin walled construction.

BACKGROUND OF THE INVENTION

The more usual manner of assembling piping systems from standard copper pipe involves the threading of the ends of the pipe, and the joining of the pipe ends to each other using internally threaded unions.

Apart from the requirement to caulk threaded unions to prevent leakage at the threads, no particular problems arise in providing a securely sealed joint.

Alternatively, the pipes are joined to each other by unions which are sweat soldered or brazed onto the respective pipe ends, this technique more commonly being employed for thin walled copper pipe.

The formation of such pipe joints in these manners is laborious and time-consuming, and in turn is a relatively expensive procedure.

Similar configurations of joints have been proposed for securing lengths of plastic pipe to each other. In this case, the joints are provided by unions which are solvent welded, heat fused or adhesively attached to the pipe ends. Again, this is a laborious and time-consuming procedure, and in turn is relatively expensive.

Further, there is the possibility that one or more of the joints provided in the system will prove defective and leaking. This, however, cannot be discovered until the entire system is completed and pressurized, at which time no opportunity exists of remaking the particular defective joints without first draining the system.

Mechanical couplings for plain ended pipes previously have been proposed, which do not require threading of the pipe ends or soldering or adhesive attachment of the connecting fittings. However, such constructions have been relegated to small diameter piping systems operating at relataively low pressures in that problems of slippage of the coupling on the pipe arise under axial loading of the pipes.

The major problem in such couplings is that some form of mechanical attachment must be provided between the coupling and the pipe in order to withstand axial loads exerted on the pipe. Provided that provision is made for absorbing axial loads on the pipe, then, such couplings can prove satisfactory in piping systems operating at considerably higher pressures and assembled from pipes of larger diameters.

Examples of mechanical connectors are to be found in U.S. Pat. Nos. 4,466,640, 4,282,175, and 4,229,025, each of which provides a coupling provided internally with gripping teeth in order to increase the holding strength of the coupling, and, to increase the pressure handling capacity of the system. However, such mechanical couplings are typically restricted because of poor pipe retention to piping systems employing pipes of 2" diameter or less.

The requirement for providing separate toothed gripping members has in turn resulted in a considerable increase in the cost of the couplings, and in the assembly of the relatively complicated couplings prior to use. Further, and in the case of the prior proposals, no opportunity exists of releasing the pipe from the coupling once it has been set. Such may be required during adjustment of the assembly or reassembly of the piping system.

A further problem is that the material from which teeth are formed must be hard enough to penetrate or "bite" the surface of the pipe so that the coupling is capable of restraining the pipe against pull-out forces produced by internal fluid pressure and external loads. Thus, a few teeth providing relatively deep penetration, or, alternatively, many teeth with little penetration are required to provide the necessary restraint. The forces required to provide this penetration are very large and difficult to achieve with suitable materials. These end restraint requirements increase with increasing pipe diameter, and prior devices have been limited to relatively small diameter pipes and tubing.

SUMMARY OF THE INVENTION

It is an object of this invention to provide a coupling for plain ended piping systems in order to eliminate the requirement for threading, soldering or adhesively attaching the couplings to the pipes, and which also eliminates the need for complex and relatively expensive machining and assembly operations in the formation of the coupling.

It is also an object of this invention to provide a coupling which readily can be disassembled from a piping system and subsequently re-used.

To these ends, the present invention provides a coupling which readily can be formed from plastics material by injection molding techniques, or, one which readily can be formed from metals by conventional metal forming techniques.

The coupling includes a connector member for the reception of a sealing member, the sealing member providing the required sealing capability of the coupling.

In the event that an O-ring or the like structure is employed as the sealing member, that ring can either be located within a groove formed within the inner periphery of the coupling member, in order that the O-ring be isolated from stresses produced by other members of the coupling, or, it can be exposed in the axial direction for the sealing member to provide an axially directed force when under pressure loading.

Additionally, the stresses provided by other members of the coupling can be employed to stress the sealing member into sealing engagement with the external periphery of the pipe to be sealed.

In order to secure the coupling and provide for significant structural strength in the joint, the coupling is provided internally with an assembly of wedging members which are circumferentially spaced from each other for the assembly of wedging members to be contractable in diameter in a radially inward direction. The wedging members are each approximately axially straight on their inner surface, and are axially tapered on their outer surface, in order for them to cooperate with a camming ring providing a camming surface for cooperation with the tapered outer surface of the respective wedging members.

Optionally, and for convenience in assembly of the coupling, the respective wedging members can be attached to each other or to an ancilliary support member for them to be handled as a unitary collet member.

The camming ring can either be formed integrally with the connector member and internally thereof, or, can be formed on a securing member which is to be moved axially with respect to the connector member, the camming ring providing for the locking and securing of the coupling upon axial movement of the camming ring by moving it axially with respect to the associated connector member.

The camming ring is moved axially relative to the wedging members and in turn cams the wedging members radially inwardly to bring them into clamping and gripping engagement with the exterior periphery of the associated pipe.

In order to further enhance the gripping capability of the wedging members with respect to the pipe, the axial inner surface of the wedging members is coated with grit material of a type commonly used in abrasive materials such as sandpaper, grinding belts and the like, which has been attached to the axial inner surface of the wedging members by adhesives, or by any other suitable means. The grit material employed is chosen to be of a hardness greater than that of the pipe and greater than that of the wedging members so that it will bite into and become matrixed within the mutually presented surfaces of the pipe and wedging members. Preferably, the grit material is a sharp grit material presenting sharp points and edges for biting engagement with the pipes to be secured.

The grit material either can be applied directly to the axial inner surface of the respective wedging members, or can be carried on one side of a layer of paper or fabric, the opposite side being adhesively attached to the axial inner surface of the respective wedging members.

Typically, a thermoplastic or thermosetting plastics material is employed as the material used in forming the wedging members. Other materials can be employed, such as compressed bonded fiber, or any other material that is inherently resistive to volumetric compression, including relatively ductile metals.

Upon tightening down of the camming ring, the wedging members are moved radially inwardly, an end stop or other member being provided on the connector member to prevent or restrict axial movement of the wedging members so as to assure cause radially inward contraction of the assembly of the wedging members.

In the alternative, the wedging members can react against a sealing member contained within the connector member, and act to compress the sealing member into sealing engagement with the pipe periphery, subsequent to which the wedging members will be moved into compressive engagement with the periphery of the associated pipe.

On pressurization of the piping system and consequential axial force exerted on the sealing member by the fluid pressure acting thereon, the wedging members will be subjected to an oppositely acting axial force which will further cause inward movement of the wedging members in reacting against the camming ring.

In contracting radially inwardly and into engagement with the exterior of the pipe surface, the particles of sharp grit material providing the coating on the inner surface of the wedging members will be forced into the external surface of the associated pipe, and also into the mutually presented surfaces of the wedging members, and, will act to plasticly deform the material of the surface of the pipe and that of the wedging members in order that the sharp grit particles become partially embedded in the external surface material of the pipe and the wedging members and partially matrixed therein.

The resultant joint is extremely efficient in its sealing capability, and also, is extremely resistive to displacement relative to the associated pipe when under axial loading or under torsional loading, thus very materially raising the pressure handling capability of the joint, sometimes to above the pressure handling capability of the piping system itself, and also permitting the use of the coupling with pipes of a diameter considerably in excess of the relatively small diameter pipes of the prior art.

A major contribution to the strength of the joint is as direct consequence of the grit material matrixing itself within the opposed faces of pipe and the wedging members instead of merely being adhesively attached to the surfaces of the wedging members. In this manner, the grit particles become supported by the respective pipe and wedging members and are capable of resisting considerably greater axial and torsional forces than if they were merely confined between the respective pipe and wedging members.

DESCRIPTION OF THE DRAWINGS

The invention will now be described with reference to the accompanying drawings, which illustrate preferred embodiments of the invention, and in which.

DESCRIPTION OF THE PREFERRED EMBODIMENTS

Figure 1:
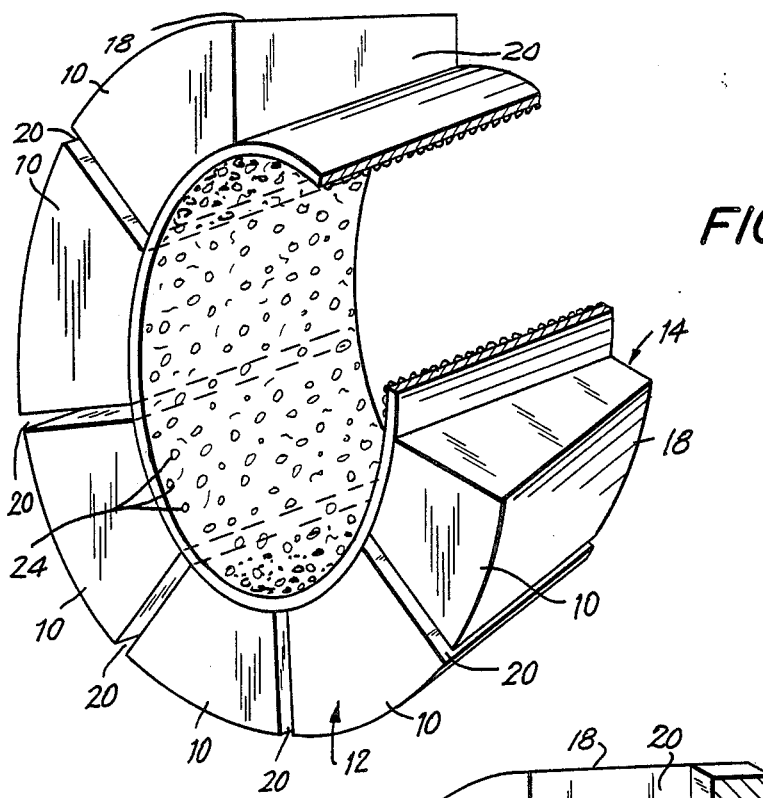
FIG. 1 is a perspective view of an assembly of wedging members for use in a coupling according to the present invention, the assembly being shown partially broken away to more clearly reveal the construction thereof.
Figure 2:
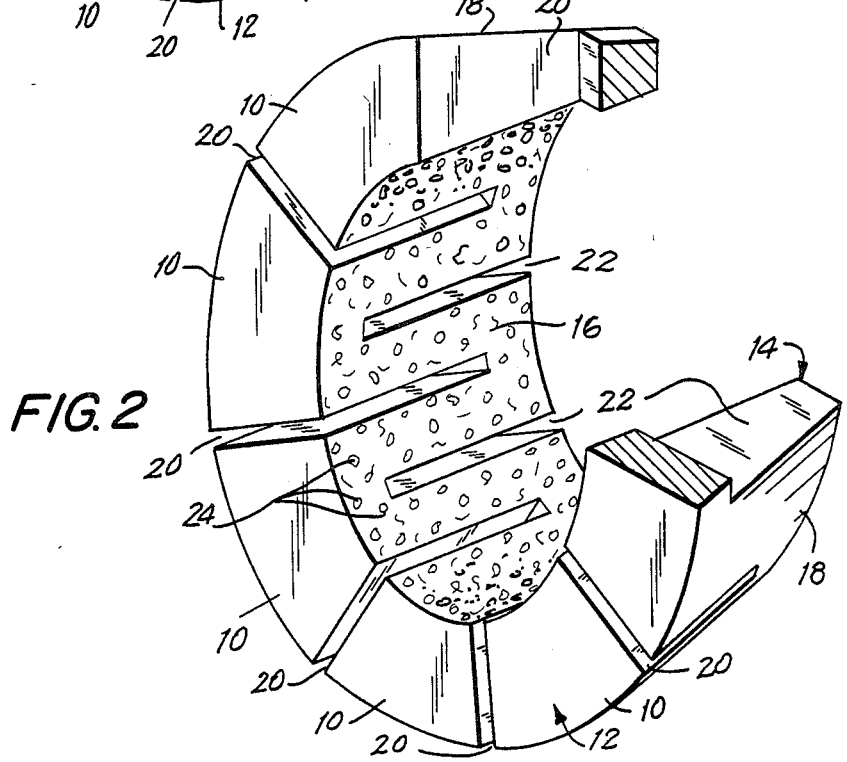
FIG. 2 is a perspective view corresponding with FIG. 1, and showing an alternative form of the wedging members of FIG. 1 partially broken away in order to illustrate its configuration.

As each of the preferred embodiments incorporates at least one of the assemblies of wedging members as illustrated in FIGS. 1 and 2, the broad concept of the invention is now discussed with particular reference to those Figures.

As shown in FIGS. 1 and 2, the wedging members 10 are arranged in the form of a tapered ring-shaped collet, which proceeds from an end-face 12 to an axially opposite end face 14 of smaller radial extent than the radial extent of the end face 12.

The inner circumference 16 of the respective wedging members 10 is axially straight or nearly so, such that the collet formed from those members will fit over the exterior periphery of a pipe, with the inner surface of the respective wedging members 10 lying in substantial parallelism with the outer surface of the pipe. It is not, however, an essential consideration that the inner surface be axially straight, only that it lie in substantial parelellism with the exterior surface of the members to be secured.

The outer surface 18 of the respective wedging members, as is illustrated in FIGS. 1 and 2, is tapered in the axial direction, and proceeds from the end face 12 of larger diameter to the end face 14 of smaller diameter in an uninterrupted straight line taper. This uninterrupted taper is preferable but is not essential to the invention, provided that the outer surface 18 of the respective wedging members provides a ramp cam for use in moving the associated wedging member in a radially inward direction and thus compressing the collet in the radially inward direction to reduce the effective diameter of its inner surface and in order to bring the inner surfaces of the wedging members into gripping relationship with the outer surface of a pipe.

To permit this movement of the wedging members and contraction of the collet, the collet preferably is formed with axially directed slots 20.

In the embodiment of FIG. 1, the slots extend completely through the collet and between the end faces 12 and 14. In the embodiment of FIG. 2, the slots extend only partially through the collet, one set of slots extending axially into the collet from the end face 12 and terminating short of the end face 14, another set of slots 22 extending axially into the collet from the opposite end face 14 thereof, and terminating short of the end face 12.

The slots 22 in FIG. 2 are located intermediate the slots 20, such that the collet is of axially castellated form, and thus capable of radially inwardly compression for the purpose of reducing the effective diameter of the inner surface by a sufficient extent.

In both FIGS. 1 and 2, the inner surface of the respective wedging member throughout its entire extent, or at least a major portion thereof, is coated with a grit material, such as carborundum grit, aluminum oxide, flint grit or a silicate grit of a coarse grade and which presents sharp biting points and edges, which is securely attached to the inner surface 16 in any one of several convenient manners.

In the embodiment of FIG. 1, the sharp grit material is applied to one face of a substrate of paper or cloth or, to the inner surface of a tube formed of such materials, using adhesives to secure the sharp grit material to its substrate. Alternatively, the substrate can be of a plastics material in which the grit material is matrixed, or, the sharp grit material can be secured in the face of that material by applying heat and pressure. The wedging members are then secured to the substrate, or vice versa, using further adhesives.

In the embodiment of FIG. 2, the inner surface 16 of the wedging members providing the collet is coated with a suitable adhesive, and then the sharp grit material 24 is applied directly to that surface, such that it becomes adhesively attached to the inner surface upon curing of the adhesive. Optionally, or alternatively, after such coating of the inner surface 16 with an adhesive and the adhesively attached grit material, the grit material can be pressed into the inner surface of the collet using heated rolls or other members in order to at least partially embed the grit particles 24 in the surface 16. Such a technique can be used with advantage particularly in the event that the collet 10 is formed from a thermoplastic plastics material, such as is the material more particularly envisaged for use in fabrication of the wedging members and the collet.

Alternatively, and in the event that the collet is formed from a ductile metal, the sharp grit particles 24 can be attached to the inner surface 16 by a soldering operation or other such heat activated technique.

Preferably, the sharp grit particles 24 are selected for them to have random sharp points in the manner of sandpaper, the sharp points predominantly extending radially inwardly of the inner surface 16, such that they provide a sharp biting surface for coaction with the outer surface of a pipe. Optionally, this operation can be performed under the influence of an electrostatic field in order to secure the most favorable orientation of the grit particles.

If the pipe is formed from a relatively soft material, such as copper alloy, brass, aluminum, plastics, fiber glass and the like, then, on movement of the wedging members radially inwardly into engagement, the sharp points of the grit particles will embed into the outer surface of the pipe and into the mutually presented surfaces of the wedging members, such movement being dominantly in a radial direction relative to the pipe and the wedging members. In so doing, the sharp grit particles become at least partially matrixed with the external surface of the pipe, and mutually presented surfaces of the wedging members. This provides an extremely strong bond with the exterior pipe surface that is resistive both axial and torsional forces, thus providing a high-strength connection between the wedging members of the collet and the associated pipe, the grit particles in effect providing a multitude of individual keys of both axial and circumferential orientation between the pipe and the wedging members.

The wedging members and the collet of FIG. 2 may be formed by any convenient manufacturing techniques, a particularly advantageous technique being the forming of those members by the injection molding of a thermoplastics material. Alternatively, those members can be formed by the compression molding of a fibrous material incorporating a bonding agent, the particular shape of the collet form readily facilitating such a compression molding operation. Altneratively, those members can be formed by a die casting operation from a relatively ductile metal, such as an aluminum alloy the shape of the collet form, again, facilitating such a casting operation.

Various embodiments of couplings incorporating the wedging members of FIG. 1 or the collet form of those members of FIG. 2 will now be described with reference to FIGS. 3 through 7, each of which can employ one or the other form of the wedging members.

Figure 3:
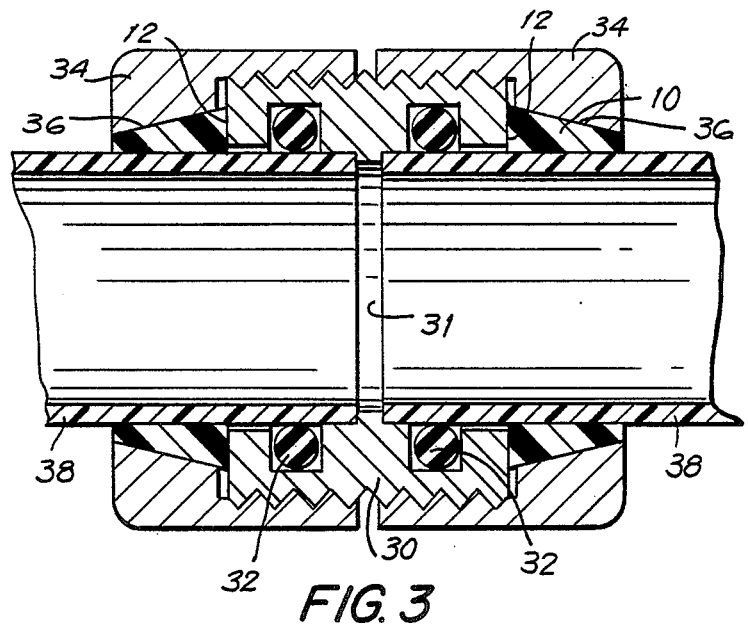
FIG. 3 is a cross-section through one form of coupling according to the present invention, embodying wedging members either as shown in FIG. 1 or as shown in FIG. 2.

In FIG. 3, the coupling incorporates an externally threaded sleeve 30 having internal grooves for the reception of O-rings 32.

Positioned at each ends of the sleeve 30 is a collet form of the wedging members 10, as described with reference with reference to FIGS. 1 and 2, the collet being arranged with its end surface 12 in abutting relationship with the opposite ends of the sleeve 30.

Threaded onto the sleeve 30 are cap nuts 34, the respective cap nuts having tapered inner surfaces 36 of corresponding taper to the outer surface 18 of the collet.

In order to assemble the coupling, pipes 38 are "stabbed" into the sleeve 30 prior to tightening down of the cap nuts 34, the sleeve 30 conveniently being provided with an internal abutment 31 in order to limit the extent of penetration of the pipe ends.

After the pipe ends are properly positioned within the sleeve 30, the cap nuts 34 are then threaded down on the sleeve 30 in order to force the tapered surface 36 of the respective cap nuts axially relative to the wedging members 10 of collet, and in so doing contract the collet in diameter, and in turn, force the grit particles 24 on the inner surface of the coupling respective wedging members into biting and gripping engagement with the pipe ends.

Figure 4:
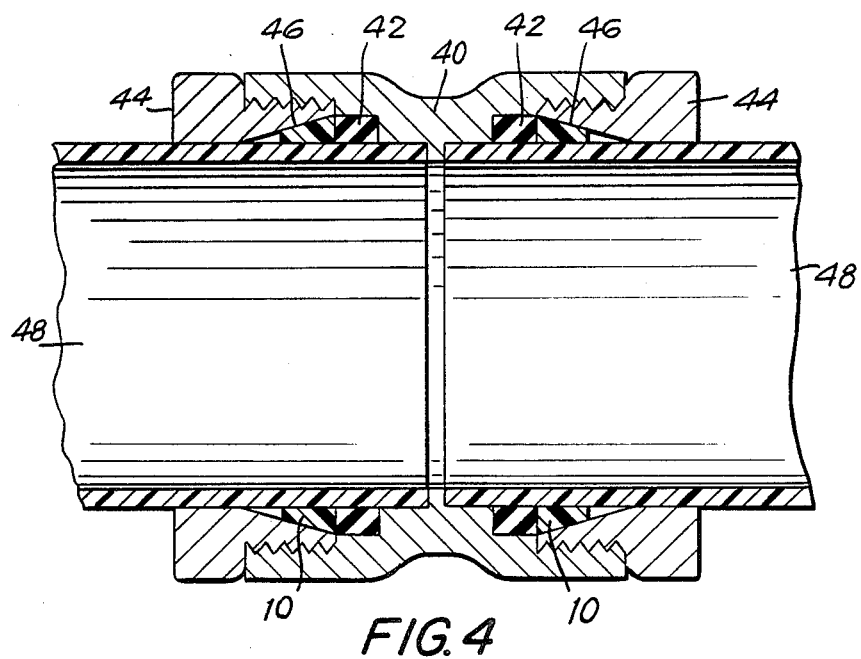
FIG. 4 is a cross-section through an alternative form of coupling according to the present invention, and, embodying wedging members as shown in FIG. 1 or as shown in FIG. 2.

A similar configuration is illustrated in FIG. 4, but in the reverse of the embodiment of FIG. 3. In FIG. 4, the sleeve 40 is internally threaded, and is provided internally with grooves for the reception of sealing rings 42. Externally threaded ring nuts are threaded into the bores of the sleeve 40, the respective ring nuts having tapered internal surfaces 46 of corresponding taper to the taper of the external surface of the wedging members 10 of the collet.

To assemble the coupling, pipes 48 are "stabbed" into the coupling, subsequent to which the ring nuts 44 are tightened down in order to contract the collet, and in the same manner as the embodiment of FIG. 3, cause the grit particles on the inner surfaces of the wedging members to bite into and grip the pipes.

The embodiments of FIGS. 3 and 4 are particularly advantageous for use with pipe formed from plastics material, the coupling itself, including the sleeve and the cap nuts or ring nuts being formed from a moldable plastics material.

Figure 5:
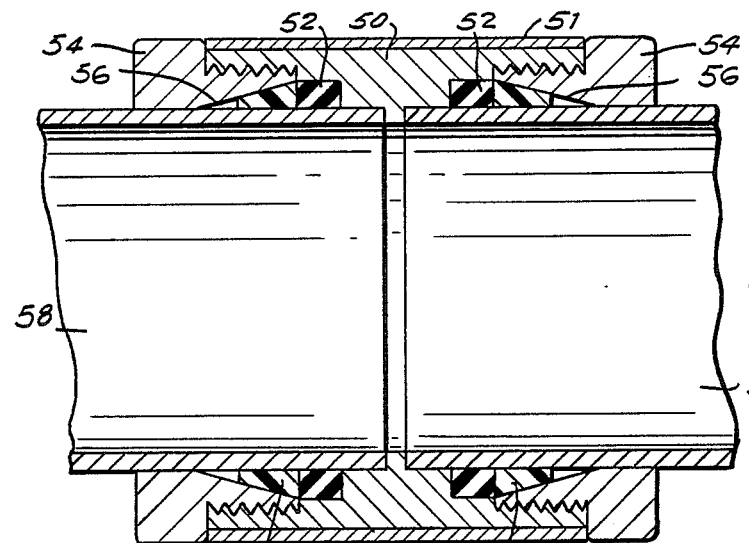
FIG. 5 is a cross-section through still another form of coupling according to the present invention, again embodying wedging members as disclosed in FIG. 1 or as shown in FIG. 2.

For higher pressure applications, such as in providing a joint between copper pipes, preferably the embodiment of FIG. 5 is employed.

In FIG. 5, an internally threaded sleeve 50 is provided with internal recesses for the reception of sealing rings 52, the wedging members 10 being received within the tapered inner surfaces 56 of ring nuts 54.

The sleeve 50 and the ring nuts 54 each can be formed from a moldable plastics material. To increase the structural strength of the joint, the internally threaded sleeve 50 is encased in a sleeve of a structurally strong metal 51, which conveniently can be a sleeve formed from the same metal as the pipes 58.

Figure 6:
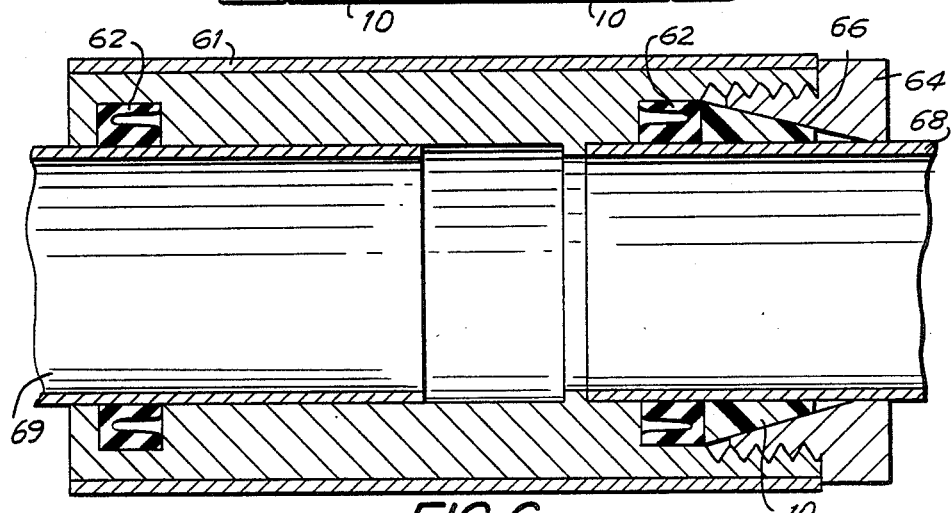
FIG. 6 is a cross-section through a coupling providing an expansion joint, the coupling, again, employing wedging members as shown in FIG. 1, or as shown in FIG. 2.

An extremely useful modification of the concept of FIG. 5 is illustrated in FIG. 6, in which the right-hand end of the coupling is formed in exactly the same manner as the right-hand end of the coupling in FIG. 5. The left-hand end of the coupling is a sliding fit over a pipe, and is sealed against the pipe, such that the pipe can slide internally within the associated left-hand end coupling, thus providing a highly effective but relatively inexpensive expansion joint for pipes.

In FIG. 6, the internally threaded sleeve is indicated at 60, the sealing rings at 62, and the single ring nut at 64. The ring nut 64 has an internal taper 66 corresponding with that of the external surface of the wedging members 10, the sleeve 60 being structurally reinforced by an external sleeve 61 in the event that the sleeve 60 is formed from a plastics material, the sleeve 61 being formed from a suitable metal.

Upon proper assembly of the coupling, one end of the coupling becomes rigidly attached to the pipe 68, the other end of the coupling being arranged in sliding relationship with respect to the pipe 69, thus enabling the pipe 69 to move relative to the coupling, and expand into the coupling or contract within the coupling, within the permitted linear extent of such expansion of contraction.

Figure 7:
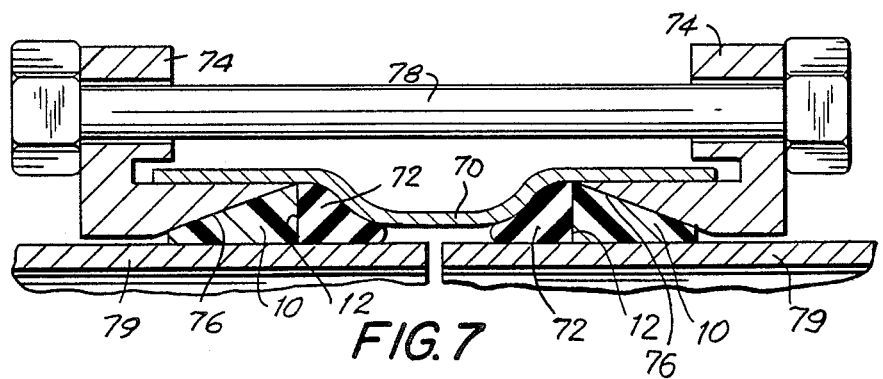
FIG. 7 is a cross-section through one side of a coupling of particular use in installations comprised of fiber-glass pipe, and again employing wedging members as shown in FIG. 1 or as shown in FIG. 2; and, FIGS. 8 and 9 are cross-sections through further embodiments of couplings useable as single ended or mating double ended flanged connectors, again employing wedging members as shown in FIGS. 1 and 2.

A further embodiment of coupling embodying exactly the same principles as those discussed with respect to FIGS. 3, 4 and 5 is illustrated in FIG. 7, this coupling having particular application in securing and sealing pipes formed from plastic reinforced fiber glass, thin wall fiber glass pipes being inherently weak when placed under radial compression.

In FIG. 7, a sleeve 70, formed for example, from stainless steel or any other suitable metal extends in bridging relationship with the pipe ends, and spigots into end members 74 which are axially slidable relative to the pipes and also relative to the sleeve 70, the end members 74 each having an internally tapered surface 76 of corresponding taper to the external surface of the contained wedging members 10.

Sealing rings 72 of an elastomeric material are positioned in abutting relationship with the end faces 12 of the respective wedging members, thus providing a reaction member against which the wedging members 10 react.

Extending between the end members 74 are traction bolts 78.

Thus, upon tightening down of the traction bolts 78, the end members 74 are moved axially towards each other in sliding relationship within the sleeve 70. In so moving, the tapered surface 76 of the end members 74 contract the wedging members 10 into clamping engagement with the pipes 79, and, additionally act to move the wedging members 10 axially towards each other for them to compress the sealing rings 72, the sealing rings 72 in turn acting as the reaction members for the wedging members 10.

In each of the embodiments disclosed above, the coupling, if desired, can be removed from the associated pipes, either to permit adjustment of the piping assembly, or, re-use of the coupling at some other location. Thus, the coupling of the present invention finds equal applicability both in permanent and in temporary installations.

An additional advantage of the embodiments of FIGS. 4 through 7, is that the coupling itself is capable of producing a force acting to increase the holding power of the coupling upon pressurization of the piping system. This is due to the seals employed having face engagement with the ends face 12 of the respective wedging members. Thus, upon a pressure rise in the piping system, a correspondingly increasing axial force is exerted on the seals by the pressurized fluid. This increase in axial force is transmitted directly to the wedging members in an opposite axial direction to the force produced by the camming surfaces, and in turn, results in an additive axial force exerted on the wedging members and an increase in the force acting radially inwardly of the wedging members to further increase the holding power of those members, which acts not only to resist axial movement between the coupling and the pipes, but also to resist relative rotation between those members.

A further embodiment of the coupling of the invention is shown in FIGS. 8 and 9, the coupling of FIG. 9 being comprised of two of the couplings of FIG. 8 joined to each other.

In FIG. 8, the wedging members 10 are held within an end flange member 84, having a tapered inner surface 86.

A back-up ring 88 of plastic or other material provides a reaction member at the larger diameter end of the wedging members, and also provides a reaction member for an annular seal 90.

The end flange member 84 is provided with bolt holes 92 arranged in its radially extending flange, thus permitting the member 84 to be drawn axially towards a blind flance 94, or towards a juxtapose end flange member 84 as shown in FIG. 9 by torquing down traction bolts 96.

Thus, upon torquing down of the bolts 96, the end flange member will be moved axially, the wedging members 10 and the back-up rings 88 being restrained against such movement by the seal 90 of FIG. 8, or the double sided seal 98 of FIG. 9.

This will cause the wedging members 10 to move radially inwardly into gripping relationship with the associated pipes, pessurization of the pipes then resulting in a reverse axial force exerted on the wedging members 10, and acting to force the wedging member further in a direction radially inwardly of the pipes to further increase the holding power of the coupling.

While preferred embodiments of the invention have been described, it will be appreciated that many alternatives can be derived depending on particular applications, without departing from the scope of the invention as found in the appended claims. For example, while couplings for a pair of pipes have been described, the invention finds equal application in flanged couplings, nipples, Tee-branches, Y-couplings and the like, the sleeve of the coupling being provided by the nipple or other fitting, and providing the required support for the collet 10 and the associated cap nut or ring nut used for contracting the collet 10 radially inwardly into engagement with a pipe. In this manner, "stabbed" couplings readily can be provided on such fittings, thus enabling the rapid assembly of the piping systems with a maximum of enconomy and a minimum of labor.

I claim:

1. A reusable pipe coupling for pipe formed from a ductile material, of the type including a sleeve member, at least one sealing member contained within the sleeve member and for sealing engagement with an exterior surface of a pipe, an assembly of wedging members contained within the coupling, each wedging member having an axially directed camming surface on a radially outwardly presented surface thereof, and a camming ring movable axially with respect to said sleeve member, and having a camming surface complimentary to and coacting with said camming surface of each said wedging member for camming said wedging members radially inwardly upon axial movement of said camming ring in an appropriate direction; further including:
   particles of grit material on an axially directed radially inwardly presented surface of each each said wedging member for biting engagement with said exterior surface of said pipe; said wedging members each being formed of a ductile material, and said particles of grit material being of a hardness greater than the hardness of said pipe and said wedging members;
   whereby said particles will matrix themselves within the respective mutually presented surfaces of said pipe and said wedging members to provide an interconnection between said respective pipe and wedging members of enhanced resistance to axial and circumferential shear forces at the interface between said pipe and said wedging members.

2. The coupling of claim 1, in which said grit material is adhesively attached to said axially directed radially inwardly presented surface of each said wedging member.

3. The coupling of claim 1, in which said grit material is embedded within said axially directed radially inwardly presented surface of each said wedging member.

4. The coupling of claim 1, in which said wedging members are individiual wedging members arranged in a substantially circular array of said wedging members.

5. The coupling of claim 1, in which said wedging members are interconnected to form a collet assembly.

6. The coupling of claim 5, in which said wedging members are adhesively attached at their said axially directed radially inwardly presented surfaces to a substrate member in order to provide said collet assembly, said layer of grit material being provided on a radially inwardly facing surface of said substrate.

7. The coupling of claim 6, in which said grit material is matrixed within said substrate.

8. The coupling of claim 6, in which said grit material is embedded within said substrate.

9. The coupling of claim 1, in which said wedging members are interconnected with each other at their axial ends, on wedging member being connected to a next adjacent wedging member at one of its axial ends, and being connected to an oppositely next adjacent wedging member at the other of its axial ends, in order to provide a collet assembly of castellated form.

10. The coupling of claim 1, in which said wedging members are formed from a moldable plastics material.

11. The coupling of claim 1, in which said wedging members are formed as castings of a relatively ductile metal.

12. The coupling of claim 1, in which said wedging members are formed from a moldable fiber material impregnated with a bonding agent.

13. The coupling of claim 1, in which said grit material is selected from carborundum grit, aluminum oxide grit and silicon carbide grit.

14. The coupling of claim 1, including a cap nut threaded onto one end of said sleeve member, and having an internal camming surface corresponding with the external camming surface of said wedging members for contracting said wedging members in a radially inward direction.

15. The coupling of claim 1, including an externally threaded ring nut threaded into one end of said sleeve member, and having a tapered bore providing a camming surface corresponding with the external camming surface of said wedging members for contracting said wedging members in a radially inward direction.

16. The coupling of claim 15, including an axial extension of said sleeve member, and a second sealing member carried by said axial extension, whereby to provide an expansion joint for a pair of pipes.

17. The coupling of claim 15, including a reinforcing sleeve positioned over said sleeve member for increasing the pressure handling capability of said coupling.

18. The coupling of claim 14, in which both ends of said sleeve member are threaded, further including dual said cap nuts each having an internal camming surface corresponding with the external camming surface of associated said wedging members and seal members for contracting said wedging members radially inwardly.

19. The coupling of claim 15, in which both axial ends of said sleeve member are internally threaded, further including dual said threaded ring nuts respectively threaded into opposite axial ends of said sleeve member, each said ring nut having an internal camming surface corresponding with the external camming surface of associated wedging members for contracting said wedging member radially inwardly, further including said dual said sealing members respectively associated with the respective wedging members.

20. The coupling of claim 1, including dual said wedging member assemblies, said respective wedging member assemblies being received within a tubular sleeve providing a central radially inwardly extending abutment, sealing members contained within said sleeve and respectively positioned on opposite sides of said inwardly extending abutment, said sealing members providing abutments for respective wedging member assemblies, end members slidable within said sleeve and each having an internal camming surface corresponding with the external camming surface of said wedging members, and traction means for urging said end members axially towards each other whereby to move said wedging members against said sealing rings, and subsequently contract said wedging members in a radially inward direction.

21. The coupling of claim 1, in which said camming ring is formed on the internal periphery of an annular end flange member, and including means for attaching a radial flange of said end flange member to another member in compressive relation therewith.

* * * * *